(12) United States Patent
Petteruti et al.

(10) Patent No.: US 6,411,397 B1
(45) Date of Patent: *Jun. 25, 2002

(54) COMPUTER SYSTEM FOR A PRINTER WHICH STORES AND OPERATES MULTIPLE APPLICATION PROGRAMS

(75) Inventors: Steven F. Petteruti, East Greenwich; Majid Amani, Coventry, both of RI (US); Raymond P. Violette, North Attleboro, MA (US)

(73) Assignee: ZIH Corp., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/632,550

(22) Filed: Aug. 4, 2000

Related U.S. Application Data

(63) Continuation of application No. 08/926,305, filed on Sep. 5, 1997.

(51) Int. Cl.[7] .............................. G06F 15/00; G06K 1/00
(52) U.S. Cl. ..................... 358/1.18; 358/116; 358/1.15; 358/1.14
(58) Field of Search ............................... 358/1.18, 1.16, 358/1.15, 1.14, 1.6, 1.9; 235/462–467

(56) References Cited

U.S. PATENT DOCUMENTS

| | | | |
|---|---|---|---|
| 4,432,830 A | 2/1984 | Jue | 156/384 |
| 4,669,381 A | 6/1987 | Nakajima | 101/288 |
| 4,712,929 A | 12/1987 | Kitaoka | 400/76 |

(List continued on next page.)

OTHER PUBLICATIONS

Michael Abrash, Zen of Graphics Programming, Coriolis Group, Sections: "Bresenham's Line–Drawing Algorithm" and "Active Edges", (1993).

Todd King, "Drawing Character Shapes with Bezier Curves" Dr. Dobb's Journal, 1990, from Dr. Dobb's Journal on CD–ROM.

Foley, VanDamFeiner and Hughes, Matrix Transformations Applied to Graphics, Computer Graphics Principles and Practice, Addison–Wesley Publishing, 1990.

(List continued on next page.)

*Primary Examiner*—Mark Wallerson
*Assistant Examiner*—Twyler Lamb
(74) *Attorney, Agent, or Firm*—Kenneth J. LuKacher

(57) ABSTRACT

A printer has a computer system which stores and uses multiple application programs. The printer may be a label printer which includes a printing mechanism, and a computer for controlling the printer mechanism and the advancement of label stock for the printer mechanism to print labels on the label stock. Coupled to the printer may be a barcode scanner controllable by the computer. The system includes a memory accessible by the computer which stores a plurality of application programs. Each of the application programs contains instructions which are executable by the computer to operate the printer. An application program can be selected by a user, or a host computer interfaced to the printer, or automatically by the printer, for execution by the computer. Utility files are also stored in the memory separate from the application programs which may include data and programs utilized by the selected application program. Such utility files include programs for barcode decoding, barcode encoding, and character rendering. The barcode decoding program utilizes Direct Memory Access (DMA) of the computer to capture values of a timer in the computer upon each transition in a scan data signal from the barcode scanner. The captured values are stored and then decoded to provide barcode data representing one or two-dimensional barcodes. The character rendering program provides for scaling of characters, defined in font files, to desired sizes. A graphical user interface may be used on the host computer interfaced to the printer to select various parameters of printer operation.

17 Claims, 11 Drawing Sheets

U.S. PATENT DOCUMENTS

| | | | |
|---|---|---|---|
| 4,855,581 A | 8/1989 | Mertel et al. | 235/462.07 |
| 5,061,947 A | 10/1991 | Morrison et al. | 347/218 |
| 5,267,800 A | 12/1993 | Petteruti et al. | 400/88 |
| 5,402,528 A | 3/1995 | Christopher et al. | 358/1.9 |
| 5,483,624 A | 1/1996 | Christopher et al. | 358/1.18 |
| 5,503,483 A | 4/1996 | Petteruit et al. | 400/88 |
| 5,524,993 A | 6/1996 | Durst | 400/279 |
| 5,594,838 A | 1/1997 | Christopher et al. | 358/1.18 |
| 5,733,051 A | 3/1998 | Beadmen et al. | 400/83 |
| 5,825,006 A | 10/1998 | Longacre et al. | 235/462.27 |
| 5,892,971 A | 4/1999 | Danielson et al. | 710/7 |
| 6,147,767 A | * 11/2000 | Petteruti et al. | 358/1.18 |

OTHER PUBLICATIONS

Leendert Ammeraal, "Programming Principles in Computer Graphics", John Wiley & Sons Ltd., 1992.

Adobe Systems Incorporated, "PostScript Language Reference Manual", second edition, 1990, pp. 154–156.

Dan Gargia, "Discussion Section 3 Scan Conversion Distillation", at http.es.berkley.edu.

Adobe Type I Font Format, Wesley Publishing, 1990.

* cited by examiner

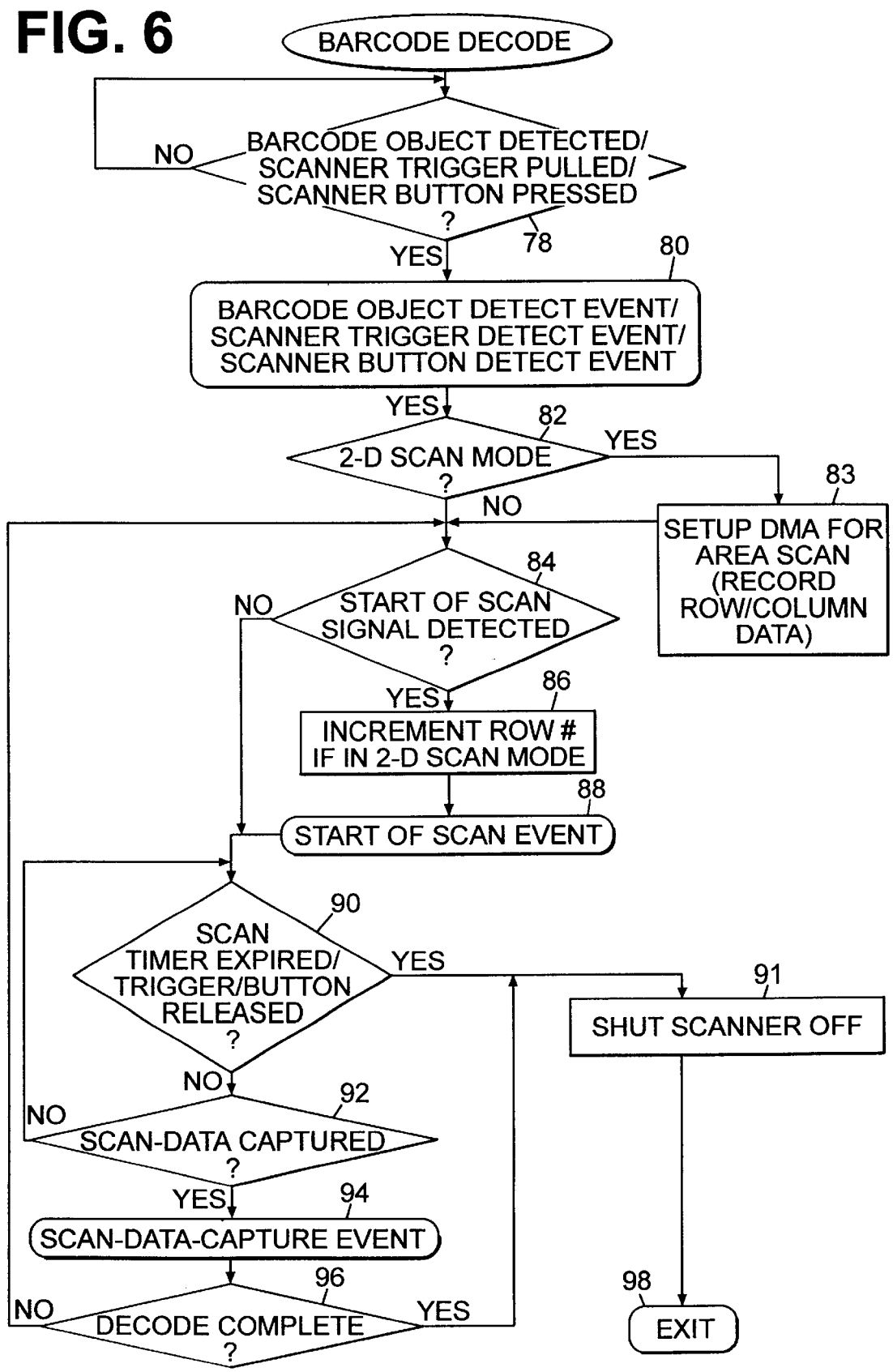

COMPUTER SYSTEM FOR A PRINTER WHICH STORES AND OPERATES MULTIPLE APPLICATION PROGRAMS

This application is a continuation of U.S. Patent application No. 08/926,305, filed Sep. 5, 1997.

FIELD OF THE INVENTION

The present invention relates to a portable label printer having a computer system, and relates particularly to, a label printer computer system for storing and operating multiple application programs. This system is useful for improving the flexibility of the label printer by allowing a user, or host computer interfaced to the printer, to select which stored application programs the computer of the printer should operate the printer in accordance therewith. The computer system provided by the invention is especially adapted to a portable, handheld label printer.

BACKGROUND OF THE INVENTION

Label printers are used in factories, warehouses and retail stores for price ticket printing and inventory control. These label printers may be hand-held or of a size and weight such that it can easily be carried by a person. The operation of the label printers is controlled by a programmed computer, such as a microprocessor, in accordance with an application program stored in memory of the printer.

Referring to FIG. 1, the software architecture of a typical label printer is shown in which memory of the printer stores an operating system and an application program file to control printer operation. The application program file generally includes an application module, and various other modules representing subroutines or data files. To reconfigure printer operation the application and command interpreter modules are downloaded into programmable memory of the printer with the remaining modules resident in read-only (non-programmable) printer memory. The command interpreter modules determine which commands the printer will respond to, while the application modules operate the printer in accordance with the interpreted commands. Accordingly, only one application program file is stored in the memory of the printer at a time.

U.S. Pat. Nos. 5,594,838 and 5,483,624 describe a computer controlled label printer which operates in accordance with a set of user generated sequence of commands which forms an application program. This application program is downloaded into programmable memory of the label printer. Each command in the sequence corresponds to one of several command routines which are also stored in read-only memory of the printer. The printer's operating system and application program interpreter is also stored in read-only memory. To reconfigure operation of the printer, a new application program is downloaded into the label printer. Only a single application program may be stored in the printer at a time.

U.S. Pat. No. 5,402,528 describes a reconfigurable label printer by downloading to alterable (programmable) memory of the printer a jump table which specifies which routines, stored in nonalterable (read-only) memory of the printer, are enabled or disabled. The sequence of the enabled routines defines the operation of the printer. Reconfiguring printer operation, requires that a new jump table be downloaded into printer memory. Accordingly, this jump table can be considered as determining the application program operating the printer.

U.S. Pat. No. 4,712,929 describes a label printer having read-only memory (ROM) storing programs for printing different label formats. Each program is limited to defining label format of information to be printed, and cannot be altered without disassembly of the printer and replacement of reprogrammed ROM devices. Accordingly, although the user can select the label format of the printer, the stored programs do not represent application programs which can be downloaded into the printer.

U.S. Pat. No. 5,267,800 describes a computer controlled label printer which contains a program in memory for controlling printing operation responsive to communication between the printer and a host computer to supply information for printing labels. The program is stored in read-only memory devices, such as an EPROM, which cannot be updated with a new program and without disassembly of the printer and replacement of reprogrammed EPROM devices.

In prior art label printers, only a single application program or table is stored in memory of the printer, thereby limiting printer operation to that defined by that particular application program. To change printer operation requires the time and expense of installing a new application program in the printer by either downloading the new application program or table, or programming and replacing read-only memory devices with the new application program. This often requires that the printer be taken out of service until the new application program can be installed in the printer. In some cases, an operator must utilize multiple label printers operating in accordance with different application programs, thereby allowing the operator to select the label printer providing the desired printer operation. This requires the cost of purchasing multiple label printers operating with different programs.

Another feature of prior art label printers is that they typically store font files in memory representing bit maps of characters to be rendered by the printer. The characters of these font files are of a fixed point size, thus to render characters of a different point size, additional font files are required. Consequently, to store font files for character of different point sizes requires additional memory, which increases manufacturing costs while still limiting available character point sizes to that stored in memory. The need for additional memory storage can become compounded when multiple fonts with different point sizes are desired.

SUMMARY OF THE INVENTION

Accordingly, it is the principal object of the present invention to provide a computer controlled label printer having an improved system for storing multiple application programs, in which the particular application program may be selected to provide desired printer operation, thereby improving flexibility in the printer operation by not requiring that a new application program be installed each time printer reconfiguration is desired.

It is another object of the present invention to provide a computer controlled label printer having an improved system for storing multiple application programs which can automatically select one of the application programs, or allow a user or interfaced host computer, to select the application program to be executed by the computer of the printer.

It is another object of the present invention to provide a computer controlled label printer having an improved system for storing multiple application programs in which the application programs need not be a series of user commands, or require commands from a host computer interfaced to the printer.

It is a further object of the present invention to provide a computer controlled label printer having an improved system for storing multiple application programs in which Direct Memory Access (DMA) may be used in decoding of one or two dimensional barcodes scanned with a barcode scanner coupled to the printer.

It is still a further object of the present invention to provide a computer controlled label printer having an improved system for storing multiple application programs in which the barcode decoding program may be a separate file from the application program.

It is still yet a further object of the present invention to provide a computer controlled label printer having an improved system for storing multiple application programs in which a program file is provided for character rendering which automatically scales characters of a font to a desired size.

It is yet another object of the present invention to provide a computer controlled label printer having an improved system for storing multiple application programs in which a graphical user interface on the host computer, interfaced to the label printer, allows a user to select parameters of printer operation for the selected application program.

Briefly described, a system embodying the invention is provided for storing multiple application programs in a printer, such as a portable, handheld label printer having a printing mechanism, including a print head, which may be a thermal print head, and a computer for controlling the printer mechanism and the advancement of label stock for the printer mechanism to print on the label stock. The stock may be a web or liner on which label patches releasably adhere, or linerless stock on which the labels are printed and which are cut into labels. Coupled to the printer may be a barcode scanner controllable by the computer. A memory accessible by the computer stores the application programs, and an operating system. The operating system is started on the computer when the computer is first activated. Each of the application programs contains instructions which are executable by the computer to operate the printer. The operating system allows one of the application programs to be selected by a user, via a keypad, or by a host computer interfaced to the printer, for execution by the computer. Application programs can also be selected automatically by the computer based on the stored application program. Utility files are also stored in the memory separate from the application programs. These utility files include files having data or programs executable by the computer in accordance with instructions of the selected application programs when executed by the computer. Such programs include a barcode decode program, a barcode encode program, and a scalable character rendering program.

The barcode decoding program utilizes Direct Memory Access (DMA) of the computer to capture values of a timer in the computer upon each transition in a scan data signal from the barcode scanner. The captured values are stored in memory and then decoded to provide barcode data representing one or two-dimensional barcodes. The character rendering program provides for scaling of characters, defined in utility font files, to desired sizes.

A graphical user interface on the host computer may provide a display with a screen for enabling a user to input various parameters of printer operation, such as selection of paper type onto which the printer prints upon, selection of detection mode for one of index marks and gaps on the paper, and selection of type of cutting of labels after each label is printed.

BRIEF DESCRIPTION OF THE DRAWINGS

The foregoing objects, features and advantages of the invention will become more apparent from a reading of the following description in connection with the accompanying drawings in which:

FIG. 6 is a flow chart showing the operations of the main program of the barcode decode files of FIG. 3;

DETAILED DESCRIPTION OF THE INVENTION

Figure 2:
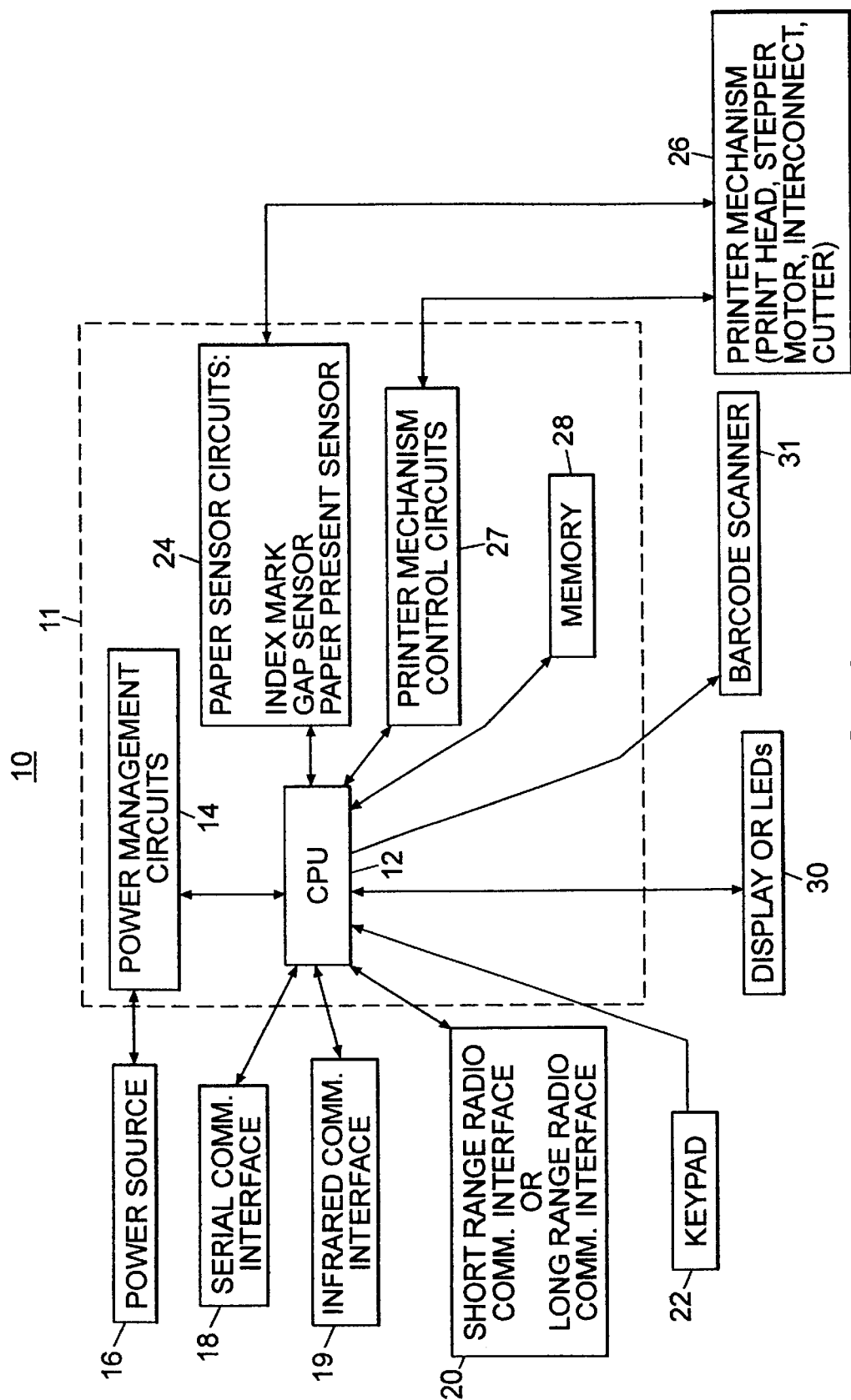
FIG. 2 is a schematic block diagram of a label printer in accordance with the present invention showing the controller of the printer.

The present invention provides a computer system especially adapted for use in a printer, such as described in U.S. Pat. Nos. 5,267,800 ('800) and 5,503,483, and in U.S. application Ser. No. 08/757,244 by S. Petteruti et al., filed Nov. 27, 1996, which are herein incorporated by reference. Accordingly, a discussion of the hardware of the printer is only briefly described below. Referring to FIG. 2, a label printer 10 is shown having a controller 11 in the housing of the printer for controlling its operation. Controller 11 includes a computer and input and output circuits therefrom and which correspond with the control circuits shown in FIG. 7 in the incorporated '800 Patent. The computer is represented by a central processing unit (CPU) 12. CPU 12 may be a microprocessor having various inputs and outputs, such as an integrated circuit chip, for example, a Motorola 68302 microprocessor. Power management circuits 14 control the voltage and amperage supplied to the CPU 12 from a power source 16, such as a rechargeable battery. An external terminal sends data to controller 10 via a communication interface which may be serial (cable-connect) 18, infrared (IR) 19, or radio frequency (RF) 20, either short range or long range. The external terminal may be a host computer which can send data representing commands, program files, or other information to controller 11. The protocol for transferring digital data may be as described in the '800 patent. Key pad 22 provides commands or data to CPU 12 from a user. The paper sensor circuits 24 control the paper-related functions of the label stock (i.e., adhesive labels upon web backing layer) to be printed upon: the sensing of index marks on the paper, the sensing of gaps between labels, and the presence of paper in the print mechanism 26. Print Mechanism 26 includes a print head for printing onto the label stock symbols, such as text, barcodes, background, or other symbols, and a stepper motor to advance the labels for printing by thermal printing elements of the print head. Printer mechanism 26 may include an optional cutter mechanism after the print head in the exiting path of the label stock to cut the label stock after printing. The cutter mechanism may be a guillotine or rotary cutter. Printer mechanism control circuits 27 control the mechanical and electrical components, which advance, print upon, and cut the label stock. CPU 12 can output information onto display or LEDs 30 to communicate with the user printer status or low battery level. A memory 28 in the printer includes programmable, non-volatile memory, such as flash memory. Memory may also be provided in read-only memory in the form of a EPROM, or in random access memory with battery backup. Memory 28 is divided into blocks or file sectors. Controller 11 may be located in the printer on a printed circuit board.

Figure 8:
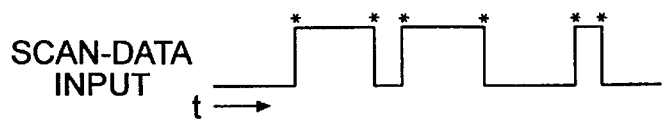
FIG. 8 is an example of a scan data signal generated by the barcode scanner of the label printer of FIG. 2.

A barcode scanner 31 is coupled to the printer for scanning a barcode on the surface of an object. The scanner may be barcode scanner, such as manufactured by Symbol Technologies, Inc. or PSC, Inc. Scanner 31 may be external to the housing of the printer, or within the housing with a port in the housing for the scanning beam to exit. This scanner provides scanning one-dimensional bar code, or if desired, two-dimensional bar code. Such a scanner 31 includes a light source which produces a beam which is reflected by a motor driven scanning mechanism, such as a mirror, to successively scan across an object. The scanner receives reflected light which varies in intensity as the beam transverses the bars and white spaces of the bar code, and converts the reflected light using an optical sensor into an electrical scan data signal representing the barcode. An example of a scan data signal is shown in FIG. 8. Scanner 31 is coupled to CPU 12 to send the scan data signal to CPU 12, and also other scanning information, such as the angular scan position of its scanning mechanism. CPU 12 can turn scanner 31 on or off by sending signals to scanner 31 which enable or disable the circuitry of scanner 31, such as by enabling or disabling the scanner's light source and scanning mechanism. A trigger or button is present on the barcode scanner 31, or scanner 31 employs barcode object detection, as in typical bar code scanners.

CPU 12 includes timers (or clocks) and has at least one input port for Direct Memory Access (DMA) operations, such as provided by the Motorola 68302 microprocessor. The scan data signal from barcode scanner 31 is connected to this input port. CPU 12, responsive to each transition (rising or falling edges) in the scan data signal from barcode scanner 31, captures the value of a free-running timer in CPU 12 and stores the capture value in consecutive addresses in memory 28. DMA may alternatively be provided by separate integrated circuit chip, which includes a free-running timer, and operates similar to CPU 12 to each transition of the scan data signal to capture the value of its timer. The captured value is then provided to CPU 12 for storing in successive addresses in memory 28. The captured timer values can be processed to decode the scanned barcode, as will be discussed later in the discussion of the operation of label printer 10.

For purposes of illustration, FIG. 2 is shown with components directly connected to CPU 12. However, separate logic circuitry, such as a field programmable gate logic array (FPGA), may be hardwired to CPU 12 and other components in controller 11. The FPGA sets up the connections between the CPU 12 and other components in controller 10 for transfer of data therebetween in accordance with a file defining such interconnectivity. This file may be stored in memory 28. Other logic circuitry in controller 12 may also be included as part of the FPGA, such as circuits 14, 24, and 27, if desired.

Figure 1:
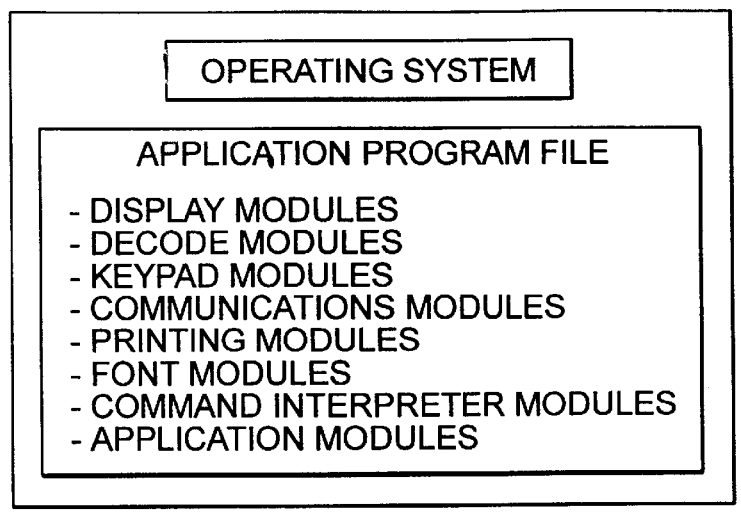
FIG. 1 is a block diagram of the software architecture of prior art computer controlled label printers.
Figure 3:
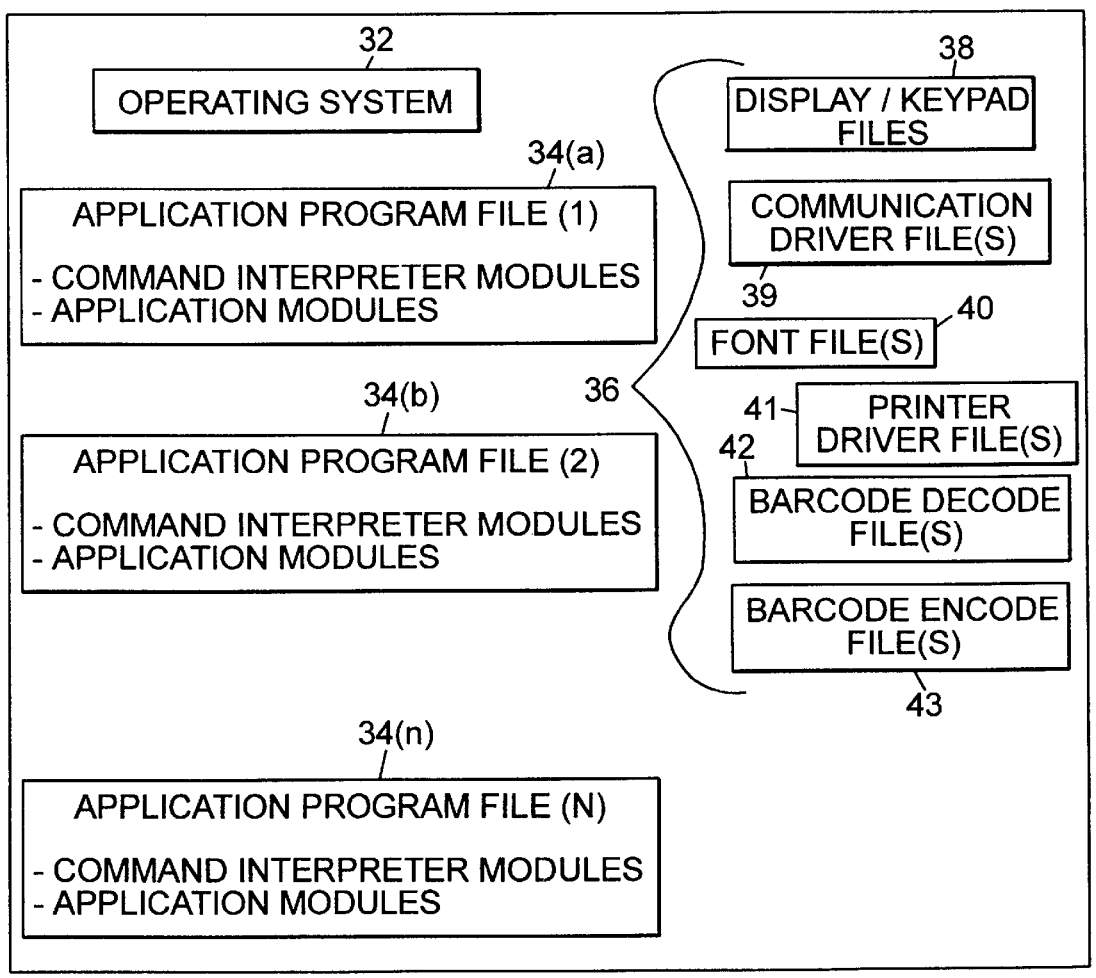
FIG. 3 is a block diagram of the software architecture in the memory of the controller of FIG. 2.

CPU 12 controls the operation of the printer in accordance with software stored in memory 28. By software is meant files containing instructions or data addressable from memory 28. FIG. 3 shows the software architecture of the label printer, which includes an operating system 32, one or more application program files 34(*a*), 34(*b*) . . . 34(*n*), and utility files 36 which may be programs or data utilized by the operating system or application programs 34 running in CPU 12. The operating system represents instructions executed upon activation of the CPU 12, such as when it is first powered up. An application program is defined herein as a program capable of controlling the operation of the printer. Each application program includes application and command interpreter modules containing instructions for operating the printer. The command interpreter modules interpret commands received by the printer, either through interfaces 18, 19 or 20, or keypad 22, and the application modules operate the printer in accordance with the interpreted commands. For example, application modules can respond to an interpreted command for scanning a barcode with scanner 31 and printing that barcode with printer mechanism 26 on a label without receiving data or any additional commands, or printing bar code labels and other information based upon data inputted via the keypad or interfaces 18, 19 or 20. Different application programs provide different printer operation. For example, different application programs may have different parameters for operating the printer mechanism control circuits 27, interfaces 18, 19 or 20, display 30, paper sensor circuit 24, or other components of the printer. This can provide flexibility to print labels on label stock of various types. Other application programs may operate the printer to perform other features, such as performing diagnostics, generating status reports, input of price changes, or replenishment of inventory.

Utility files 36 represent files including display/keypad files 38 for interfacing with display 30 or keypad 22, respectively, and communication driver files 39 for setting up the communication between CPU 12 and interfaces 18, 19 or 20. Font file(s) 40 are also provided which represent files (referred to as scalable font files) having information defining pre-scaled characters of one or more typefaces or fonts, and a character rendering program file for scaling character to different sizes as needed. Font file(s) 40 may also include typical non-scalable font files defining bit maps for printing characters of one or more fonts of different fixed sizes. The character rendering program will be described later in the discussion of label printer 10 operation. Printer driver file(s) 41 represent a printer command interpreter or printer emulator to allow CPU 12 to communicate with printer mechanism 26. Barcode decode files 42 and barcode encode files 43 are also included as utility files 36 for decoding scan data from scanner 31 and encoding barcode information for printing of barcodes, respectively. Files 42 and 43 and also the character rendering program file are executable files (i.e. programs) which can be enabled or disabled by an application program running on CPU 12. Display/Keypad files 38, communication driver files 39, and printer driver files 41, may be files typically used by a microprocessor for initializing its ports and communicating with their respective components of the printer.

Referring to FIG. 3, the main operating system program, Program/File monitor, is shown. CPU 12 runs Program/File Monitor when power from source 16 is first supplied to controller 10. This may occur when source 16 is connected in the printer, or by an on/off switch which enables power to be supplied from source 16 to CPU 12. Upon such power-up, CPU 12 initializes its various components (step 46). CPU 12 first initializes its I/O ports, and checks the validity of memory 28 block by block. To check memory validity, if a checksum value embedded in each block of memory 28 matches the actual checksum of bytes in each block, the block is considered valid. CPU 12 generates a list of all valid files it finds as it checks the memory 28 validity based on the files unique file names. CPU 12 executes files 38, 39 and 41 to set up the communication driver to interface 18, 19 or 20, display 30 and keypad 22, and printer driver, respectively. CPU 12 also sets a RESET flag in memory 28. This reset flag may also be set if CPU 12 detects a pre-determined key sequence entered via keypad 22 representing a reset command from the user. If a RESET flag is set, CPU 12 branches to step 50 and searches the list generated at step 46 for valid application program files, i.e., files in which all their blocks of memory 28 were determined valid at step 46.

The system can automatically select one of the application program files stored in memory, or a user or the host computer may select one of the application program files. An application program is automatically selected if its file name identifies it as an auto-run program. Filenames to be associated with auto-run programs are predefined in the operating system. To automatically select an application program, CPU 12 checks if any of the valid application programs found at step 50 is an auto-run program (step 52). If an auto-run application program is found, that program is executed by CPU 12 (step 53), i.e., CPU 12 begins running the stored instructions of that application program. If more than one auto-run program is found, each autorun program is successively executed based on the priority of each auto-run program. This priority is set by the different file name of each auto-run program. After executing the auto-run program, or programs, the reset flag is cleared. Step 53 is shown branching back to step 48 to represent that with the reset flag clear, CPU 12 will continue to run the current program by looping through steps 60 and 48, unless either that program terminates, which sets the reset flag, or the user enters the reset key sequence on keypad 22.

Optionally, each auto-run program is only executed once after power-up initialization, thus if an auto-run program terminates, CPU 12 will not automatically select that program again unless step 46 initialization is performed. One useful feature for automatically selecting an auto-run application program is that it can be used for inputting information from either the user, via keypad 28, or host computer, via interfaces 18, 19 or 20, which may be needed by another stored application program when executed. Such information may include identification of the user, store, company, label type, label stock type, or changes in the inventory or prices of products to be labeled. Such an auto-run program may prompt the user for this information via a menu on display 30, and then store the information in memory 28. Thus, when the auto-run program terminates, that stored information is available to another application program.

If no auto-run application program file is stored in memory 28, CPU 12 checks keypad 22 if the user has selected an application program stored in memory 28 (step 54). CPU 12 may provide on display 30 a list of valid application program found at step 50, or print out this list on a label. The user can select via keypad 22 which of the listed programs, by entering a number associated with each program, or by scrolling through the list of filenames and press a key to select a program file. If an application program file is selected by the user, CPU 12 executes that selected program file (step 55). After executing the application program file, the reset flag is cleared. Step 55 is shown branching back to step 48 to represent that with the reset flag clear, CPU 12 will continue to run the current program by looping through steps 60 and 48, unless either the program terminates, which sets the reset flag, or the user enters the reset key sequence A on keypad 22.

However, if no application program file is selected by the user at step 54, CPU 12 checks the communication interface 18, 19 or 20, for a command to select a program file from the host computer (step 56), and if so, processes that command and executes the application program file stored in memory specified by that command (step 57). In this manner, the host computer can select one of the application programs stored in memory 28. After executing the host selected application program file, the reset flag is cleared. Step 57 is shown branching back to step 48 to represent that with the reset flag clear, CPU 12 will continue to run the current program by looping through steps 60 and 48, unless either the program executed terminates, which sets the reset flag, or the user enters the reset key sequence on keypad 22.

If the particular command received from the host is a load new program file command (step 58), CPU 12 loads that new application program file via communication interface 18, 19 or 20 into memory 28 (step 59). Loading program files will be discussed in more detail below in connection with FIG. 5. If CPU 12 has loaded the new program file at step 59, or if no command was received from the host computer at steps 56 or 58, CPU 12 branches to step 48 and repeats the above steps starting with step 50 until the reset flag is cleared.

After executing the selected application program file at step 53, 55, 57 or 59, CPU 12 runs the selected application programs in that it operates the printer in accordance with the program's instructions stored in memory 28. The application program may include instructions in its command interpreter allowing CPU 12 to respond to commands received from the host computer via communication interface 18, 19 or 20 to execute or load a new program file, such as described at steps 56 or 58, respectively, or to allow a user to select another program file, such as described at step 58. Further, the application program may execute one or more of the executable utility files, such as the character rendering program file, barcode decoding program file, or barcode encoding program file. The command interpreter of the application program may operate interactively with commands entered from the host computer, via interfaces 18, 19 or 20, or the user, via keypad 22. An application program may also terminate itself after directing the CPU 12 to automatically execute another application program stored in memory 28.

Figure 4:
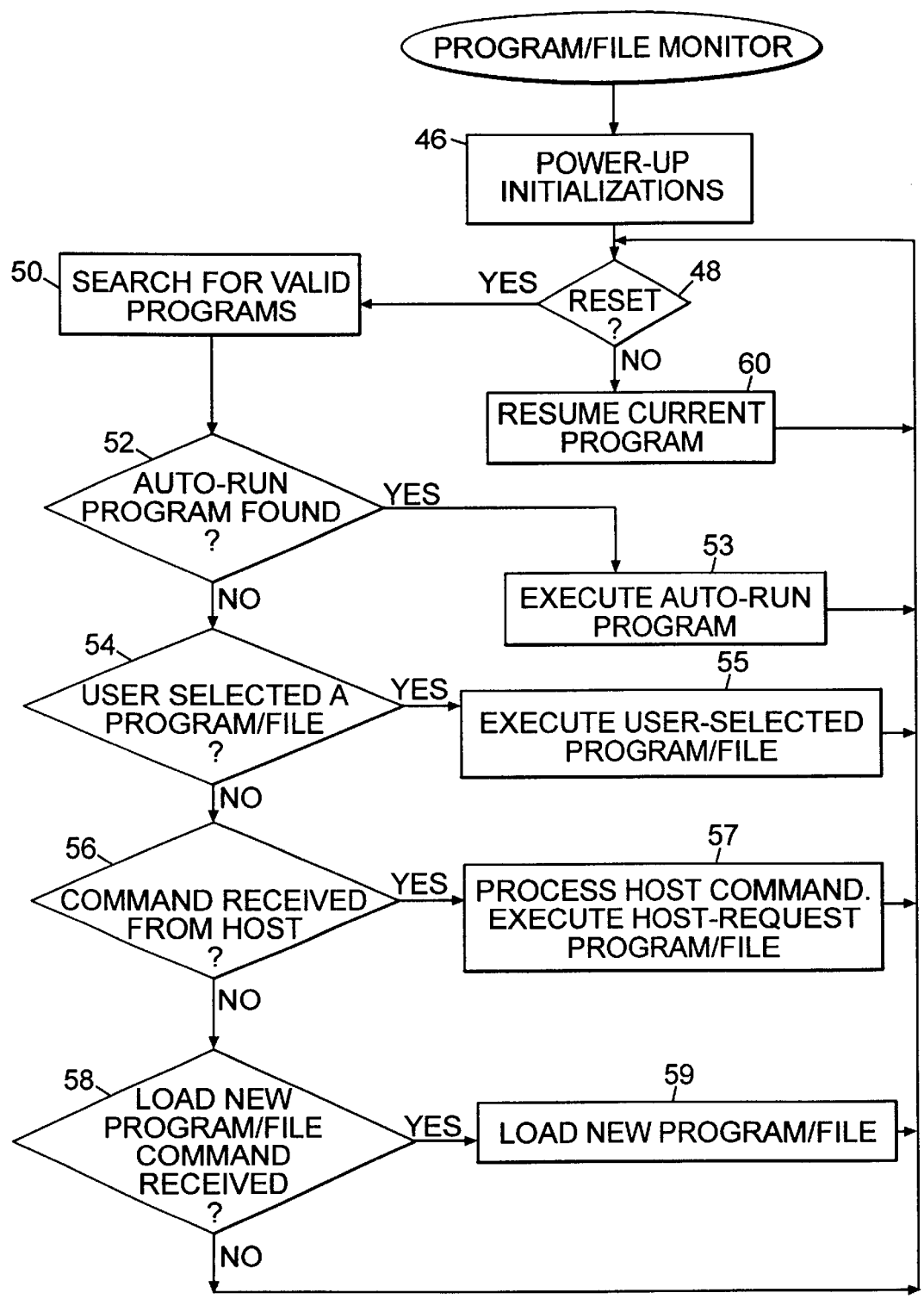
FIG. 4 is a flow chart showing the operations of the Program/File Monitor of the operating system of FIG. 3.
Figure 5:
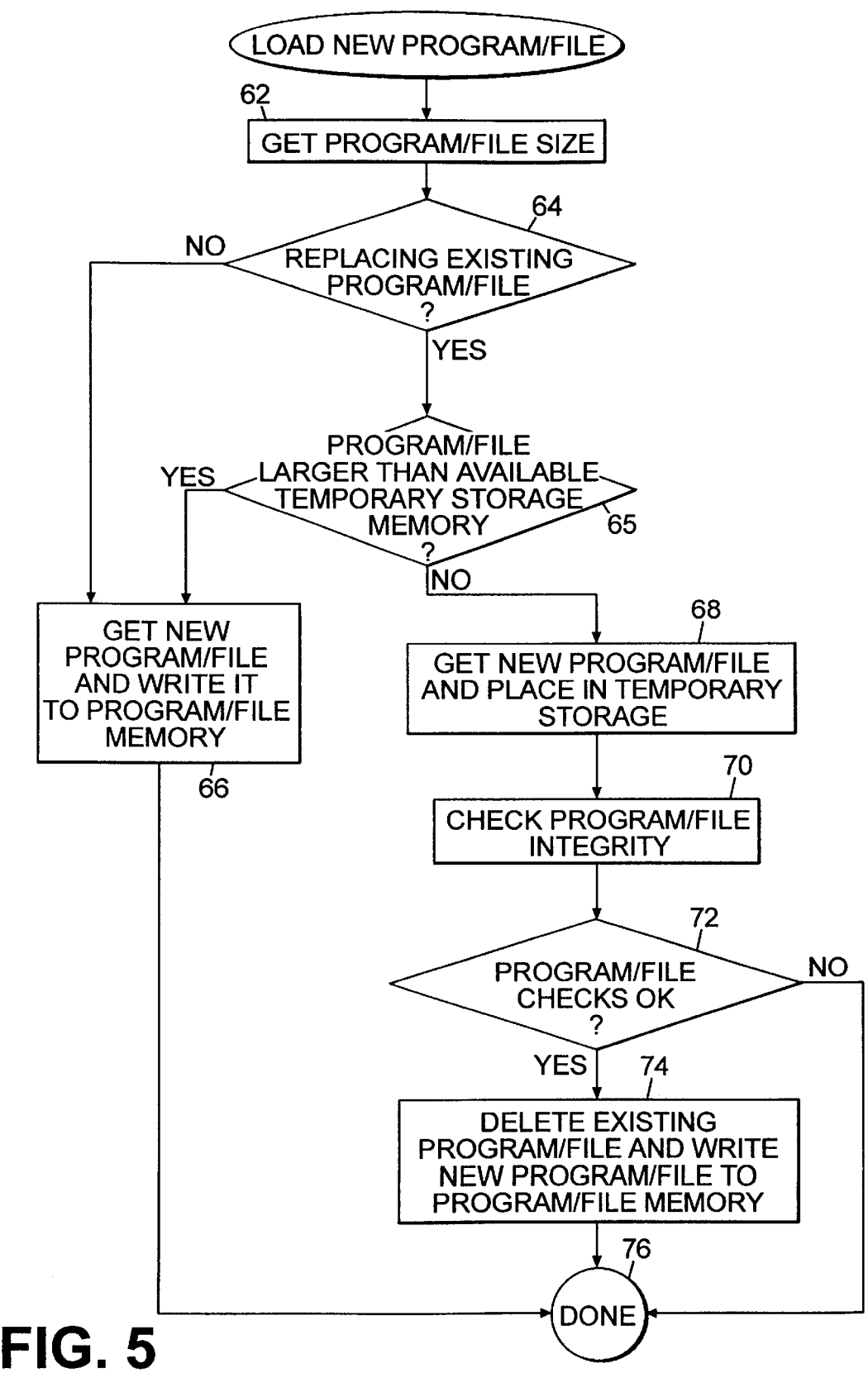
FIG. 5 is a flow chart showing the operations of the Load New Program/File subroutine called by the Program/File Monitor of FIG. 4.

Referring to FIG. 5, the operation of step 59 (FIG. 4) for loading a new application program file will be described. Responsive to receiving a load new program file command, CPU 12 requests from the host computer the file size (step 62). CPU 12 then checks if the file to be loaded replaces an existing file in memory (step 64). For example, this may be done by comparing the name of file to be loaded, which may be received in the load new program/file command, with the names of application program file in the list generated at step 50 (FIG. 4). If a match occurs, then the file is a replacement file, and CPU 12 branches to step 65. At step 65, CPU 12 checks if the size of the file obtained at step 62 is greater than available space in temporary storage of memory 28. Memory 28 includes space allocated for temporary storage of new application programs. If not, CPU 12 instructs the host computer to send the new file, and writes the received file into temporary storage (step 68). CPU 12 then checks the integrity of the loaded file by performing a checksum operation on each of its blocks (step 70), similar to that described at step 46 (FIG. 4). If the file checks OK (step 72), CPU 12 deletes the existing file of the same filename from memory 28, and the new file is loaded from temporary storage in its place in memory 28 (step 74). This optimizes storage space for application programs in memory 28 by avoiding duplicative files. From step 74, CPU 12 proceeds to step 76, and the loading of the new file is complete. If the checksum operation fails at step 70, CPU 12 branches from step 72 to step 76, and the new file is not stored in memory 28.

However, if at step 64 the new file does not replace an existing file, or if at step 65, the size of the file is larger than temporary storage, CPU 12 requests the host computer to send the new file and writes the received file into memory 28 (step 66), if available. If space is not available in memory 28, the host computer may send a command to delete a program file from memory, and then repeat the load new program file command. From step 66, CPU 12 proceeds to step 76, and the loading of the new file is complete. CPU 12 may inform the host computer whether the file was successfully loaded into memory 28 or not.

Figure 7A:
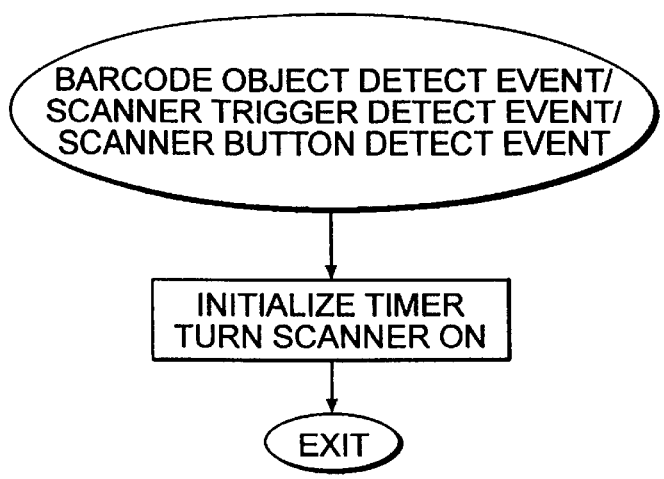
FIGS. 7A–7C are flow charts showing the operations of certain subroutines called by the Barcode Decode program of FIG. 6.

Referring to FIG. 6, the main barcode decode program of files 42 (FIG. 3) is shown for DMA capturing and processing captured transition times of the scan data signal from scanner 31 (FIG. 2) to provide barcode data representing a barcode. This program represents instructions which may be executed (enabled) by CPU 12 as directed by an application program running on the CPU. Subroutine files 7A, 7B, and 7C are referenced by the barcode decode program of FIG. 6. Barcode scanner 31 is enabled by the CPU when the barcode decode program is enabled. CPU 12 first waits for a signal from scanner 31 for a detect event, i.e., that either a barcode object has been detected by scanner 31, or the scanner's trigger has been pulled, or the scanner's button has been pressed (step 78). After one of the detect events occurs, the subroutine shown in FIG. 7A is run to initialize the free running timer for the DMA to zero, to initialize a scan timer to an upper limit value, and to turn on scanner 31. The scan timer is a timer implemented in CPU 12 in either software or hardware for measuring a preset duration of time, such as ten seconds, since the detect event of step 78. Scan time timer starts running at step 80 to count down from its upper limit until it expires. CPU 12 turns on the scanner by enabling the circuitry of scanner 31 to provide scan data signal to the CPU, such as by enabling the scanner's light source and scanning mechanism. The subroutine of FIG. 7A then exits to step 82 (FIG. 6).

Next, CPU 12 checks if scanner 31 is in two-dimensional barcode (2-D) scan mode. The 2-D scan mode may be set by the application program running on CPU 12 in response to commands received from the user or host computer, or automatically by the program itself. When not in 2-D scan mode, or where 2-D scanning is not a supported capability of scanner 31, scanner 31 is in a one-dimensional barcode scan mode. At step 83, if in a two-dimensional scan mode, the DMA is set up for area scan by allocating in memory 28 space to store row and column barcode data. Also at step 83, a row variable is set to zero. Since multiple rows of barcode data must be stored to decode a two-dimensional barcode, the row variable is used to represent the current row of the two-dimensional barcode being scanned.

Figure 7B:
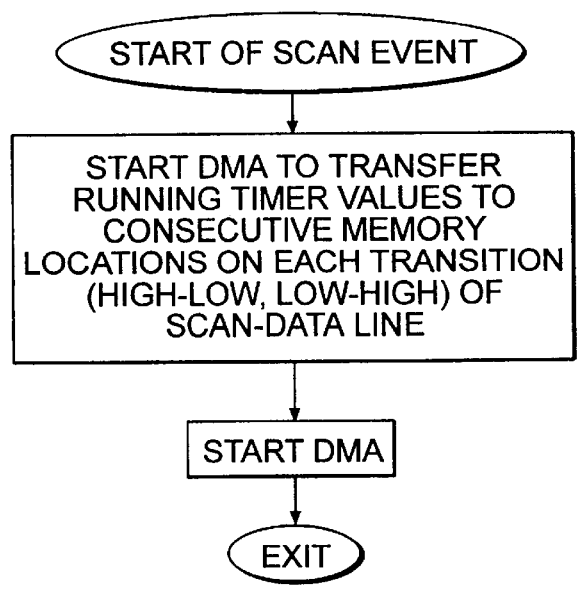
Figure 7C:
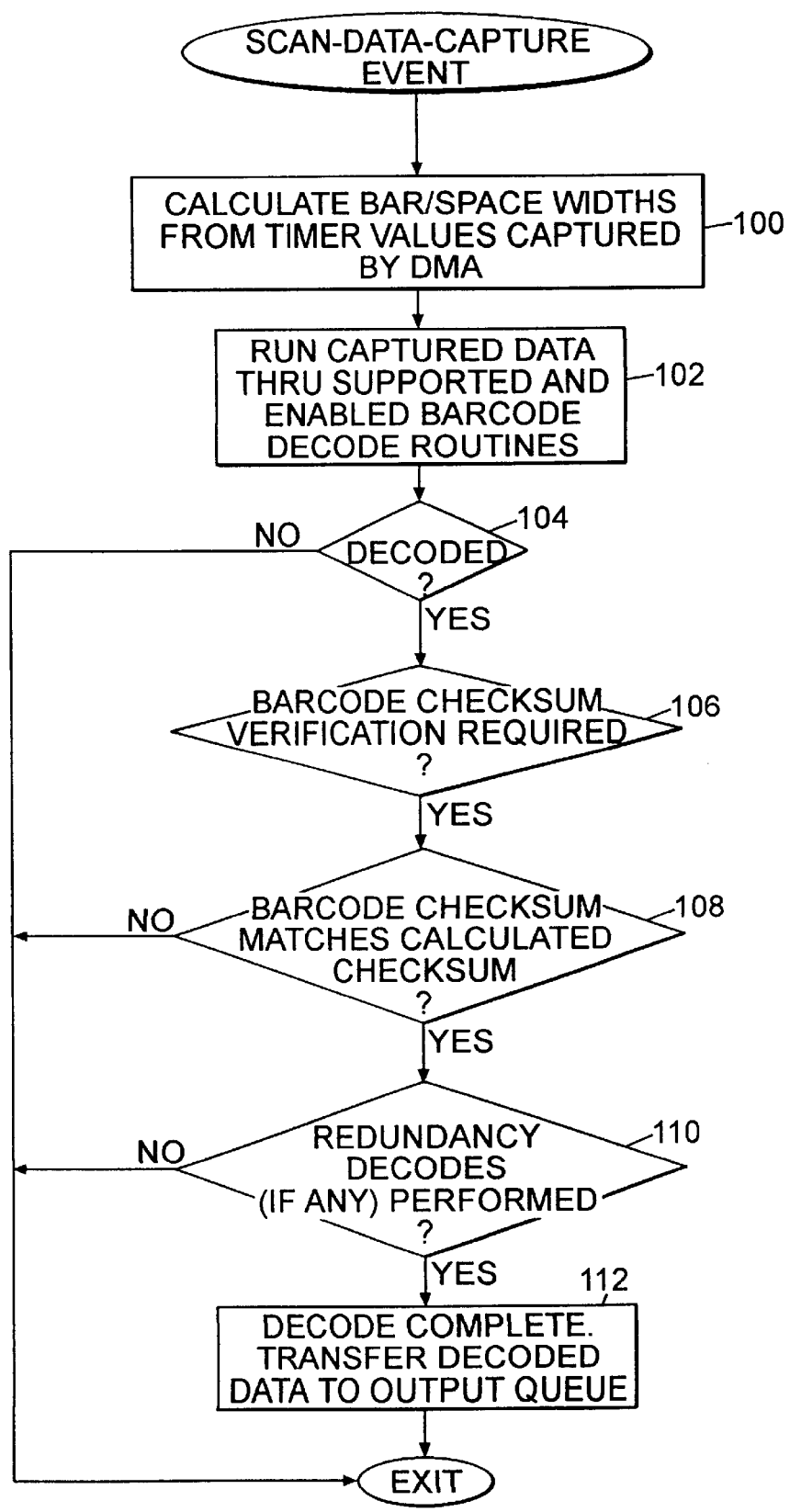

From either steps 82 or 83, CPU 12 checks if a start of scan signal has been detected in the scan data signal from scanner 31 (step 84). This start of scan signal is representative of the start of a one-dimensional barcode, or start of a new row of a two-dimensional barcode. If a start of scan signal is detected, the row variable is incremented by one if in 2-D scan mode (step 86), and the start of scan event subroutine shown in FIG. 7B is started (step 88). The start of scan event subroutine sets up the DMA of CPU 13 to transfer running timer values to consecutive memory locations upon each transition in the scan data signal received from scanner 31. DMA is then started to begin the capture of time values of the running timer. If no start of scan signal is detected, CPU 12 branches from step 84 to step 90. The subroutine of FIG. 7B exits to step 90 (FIG. 6).

In the FIG. 8 example of the scan data signal input from scanner 31 to CPU 12, the asterisked "*" parts of the signal represent each signal transition. Upon each transition, the DMA captures the value of the running timer value and stores that value in consecutive memory locations. The width of the signal between successive transitions of rising and falling edges represents a bar, and the width between the successive transitions of falling and rising edges represents a white space of the barcode.

At step 90, CPU 12 checks if the scan timer has expired, or if the scanner's trigger or button has been released. If so, the scanner is shut off (step 91) and the barcode decode program exits (step 98). If neither the scan timer has expired nor the trigger or button has been released, CPU 12 checks if the scan data has been captured at step 92 by determining whether memory storing captured running timer values is sufficiently full, i.e., has a the number of transitions recorded as captured values of the running timer sufficient to represent a barcode. If the scan data has not been captured, CPU 12 branches from step 92 back to step 90 until the scan timer expires, the trigger or button is released, or the scan-data is captured. If the scan data has been captured, the scan data capture event at step 94 is carried out in accordance with the subroutine shown in FIG. 7C.

The scan data capture event subroutine translates the consecutive stored running timer values into barcode data. At step 100 of FIG. 7C, CPU 12 calculates the width of the bars and white spaces between bars from the timer values captured by the DMA in memory. Widths are calculated by subtracting the value of each two consecutive captured timer values from memory. These calculated widths correspond to the actual widths of the bars and white spaces between bars of the barcode, because the transitions in scan data signal occur proportionally with the time the scanning beam transverses the barcode. The calculated widths represent captured data. This captured data is run through an enabled (executed) barcode decode routine for translating the calculated widths into decoded barcode data (step 102). The decode routine may be typical of routines used to decode widths of bars and white spaces into barcode data based upon the particular encoding format of the bar code. If the barcode is not successfully decoded at step 102, the subroutine of FIG. 7C exits to step 96 (FIG. 6) since decode was incomplete (FIG. 6). If needed, checksum verification and redundancy decode checks are performed on decoded barcode data from step 102 to assure that the decoded barcode data is valid (step 106, 108 and 110). Failure of these checks means that decode was incomplete, causing the subroutine of FIG. 7C to exit to step 96. Upon a successful decode of the captured data into barcode data, the decoded barcode data is transferred to an output queue for subsequent storage in memory 28. If in 2-D scan mode, the captured data represents the data of the row scanned, which is then stored as row/column data in memory 28.

Upon returning to step 96 (FIG. 6), CPU 12 checks if the decode of the captured scan data is complete, which for one-dimensional barcode occurs when the scan data captured event subroutine provides decoded barcode data, or, in 2-D scan mode, when a sufficient number of rows have been decoded over the area of the bar code. The number of rows needed to represent the two-dimensional barcode depends on the size of the two-dimensional barcode. If decoding is complete at step 96, CPU 12 shuts off the scanner at step 91 by disabling the scanner 31 circuitry, such as by disabling the scanner's light source and scanning mechanism. However, if decoding is not complete, CPU 12 branches from step 96 back to step 84 to check for another start of scan signal to repeat steps 84–96 described above. The barcode decode routine will continue until at step 90 the scan timer expires, or the scanner's trigger or button is released. In this manner, one-dimensional barcode data can be provided to an application program running on CPU 12, or the stored successive rows and columns of two-dimensional barcode data provided, such as to the application program running on CPU 12. This one- or two- dimensional barcode data may be stored for subsequent use in printing labels with the barcode. In 2-D scan mode, the successive rows and columns of the two-dimensional barcode data may be stored as a stack in which the columns of the successive rows are aligned. This stack may be decoded by another routine which is enabled to process the stack and then store in memory 28 information encoded in the scanned two-dimensional barcode. This routine may be typical of routines used to decode two-dimensional barcode data.

Although barcode decoding preferably performed as discussed above, the printer may include a typical decoder board, such as manufactured by Symbol Technologies, Inc., for decoding the scan data signal from scanner 31. The decoder board may be capable of decoding one or two dimensional barcodes depending on scanner 31 capability.

Figure 9:
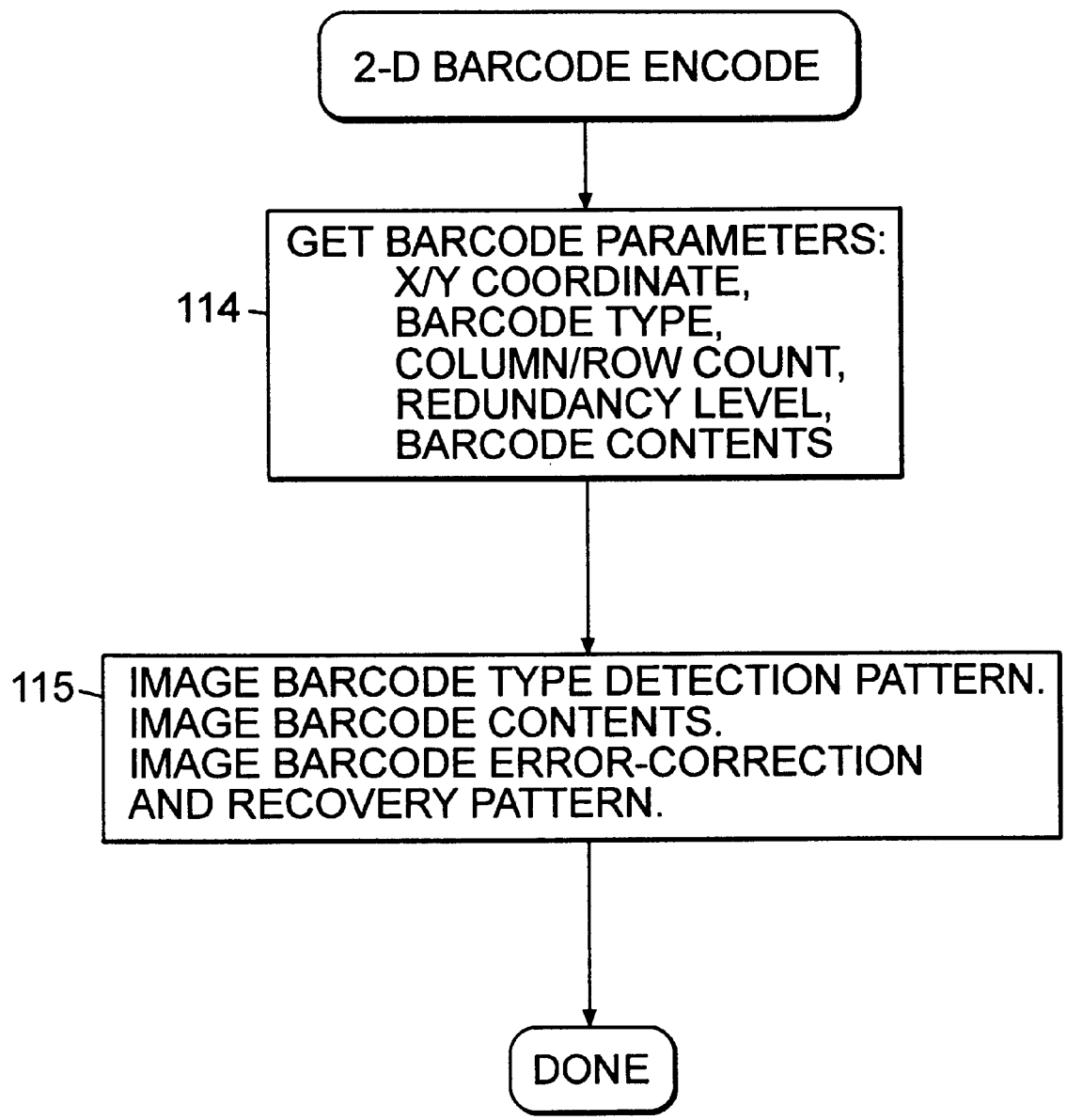
FIG. 9 is a flow chart showing the operation of the 2-Dimensional Barcode Encode program of the barcode encode files of FIG. 3.

Referring to FIG. 9, a two-dimensional barcode encode program of files 43 is shown for encoding a two-dimensional barcode for subsequent printing. Information for printing the two-dimensional barcodes may be stored in memory 28, which may have been provided from the decoded two-dimensional barcode provided by the barcode decode program of FIG. 6. At block 114 of the program, the parameters needed to encode the barcode are inputted from memory 28, or the user, via keypad 22, or host computer, via interface 18, 19 or 20. Such parameters include: x, y coordinate to start printing; the barcode type, column and row count, redundancy level, and barcode contents. Next at block 115, an image of the two-dimensional barcode to be printed is produced in image memory of memory 28 by imaging the barcode type detection pattern, barcode contents, barcode error-correction and recovery pattern. Image memory may be a bit map representing the dots or pixels representing the two-dimensional barcode. CPU 12 then directs printing mechanism 26, via control circuit 27, to print the barcode in accordance which the stored image. For example, print mechanism 26 may have print head with printing elements which may be enabled and disabled based upon each row and column of the bit map as the label being printed upon is advanced by a stepper motor past the printing elements. Similarly, one-dimensional barcode encoding may also be performed by generating in image memory the barcode based upon barcode parameters, and printing the barcode from image memory.

Figure 10:
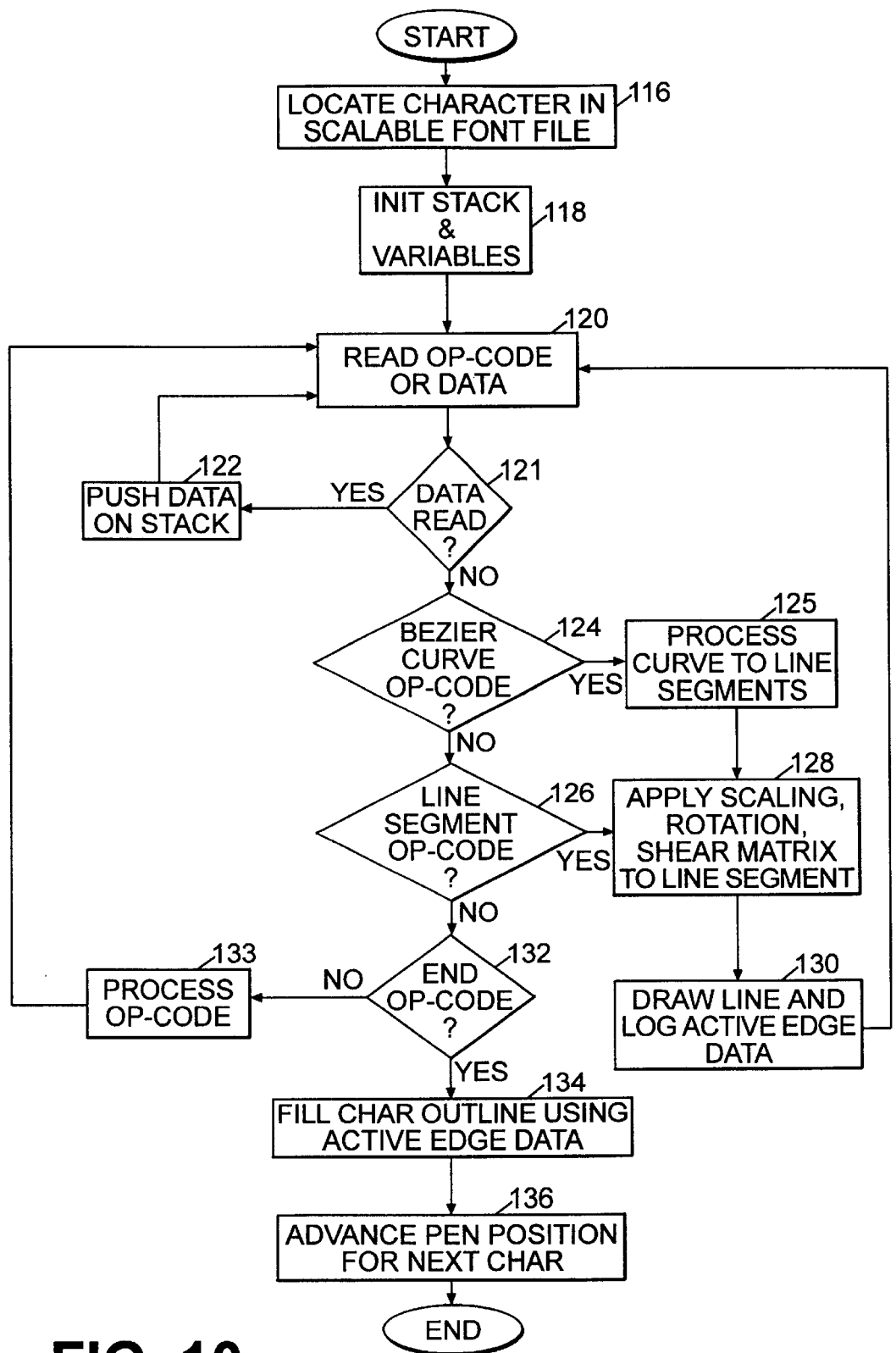
FIG. 10 is a flow chart showing the operations of the Character Rendering program of the font files of FIG. 3.

Referring to FIG. 10, the character rendering program is shown for generating in image memory of memory 28 characters of text to be printed using the scalable font files defining each character for each font. This program represents code which may be executed (enabled) by an application program running on CPU 12. First, the character to be rendered is located in the scalable font file stored in memory 28 (step 116). The character is defined in the scalable font file as a series of operations (op-code) for drawing a series of line segments and curves outlining the character in relative x, y coordinates with a virtual pen in image memory. Image memory may be a bit map for each character, in which the pen turns on pixels or dots representing the character. For example, each character may be 100 by 100 dots in image memory. Such files may be formatted similar to Adobe Type 1 font formats, as described in the publication entitled "Adobe Type I Font Format", Wesley Publishing (1990). Line segments are each defined by data representing the start point and end point of the line segment, while curves are each defined by data for a Bezier equation which represents a Bezier curve. Bezier curves are described in an article by Todd King, "Drawing Character Shapes with Bezier Curves", Dr. Dobb's Journal, published in 1990, which is on CD-ROM by Miller Freeman entitled "Dr. Dobb's Journal on CD-ROM". The data for the Bezier equation defines two ends points for the line and two control point which determine the contour of the Bezier curve.

At step 118, the FIFO stack and variables are initialized to be used in processing line segments and Bezier curves. Either an op-code or data may be read from the scalable font file for the character to be rendered. As data is read from font file for the character, it is pushed on the stack (steps 120, 121–122) until an op-code is read at step 120. The operation of reading data and op-codes may be typical of an Adobe Type 1 font interpreter, as described in earlier cited publication entitled "Adobe Type I Font Format". If data is not read at step 121, i.e., an op-code has been read, CPU 12 proceeds to steps 124 or 126 depending on if the op-code read is a Bezier curve op-code or line segment op-code, respectively.

Figure 10A:
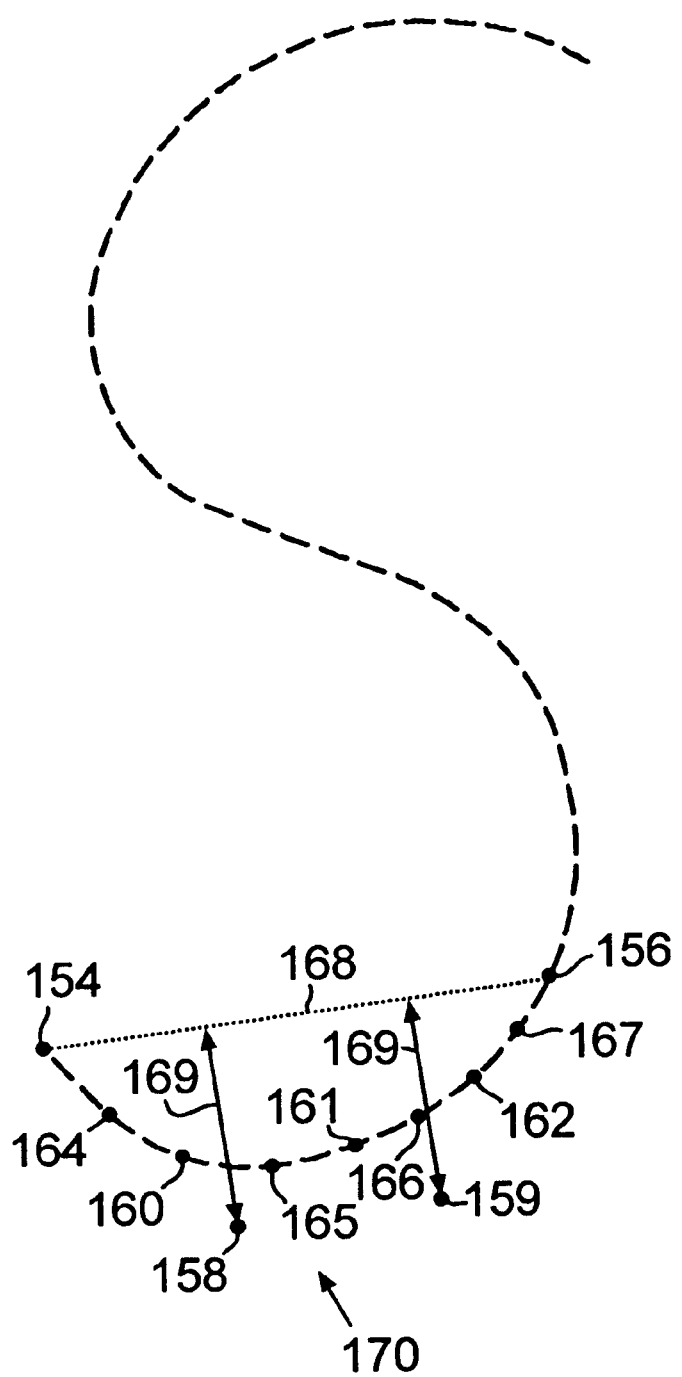
FIG. 10A is an example of the step of processing a curve into line segments in the Character Rendering program of FIG. 10 in which the bottom curved portion of a character "S" outline is approximated into multiple line segments.

If a Bezier Curve op-code was read, CPU 12 proceeds from step 124 to step 125 and executes that op-code by processing the curve into line segments. Data is read from the stack into an equation defining the Bezier curve, and then that curve is approximated into a series of line segments by the DeCasteljau algorithm for drawing Bezier curves. The DeCasteljau algorithm is described in the earlier cited article by Todd King. The DeCasteljau algorithm can reduce a Bezier curve into a series of straight line segments. The algorithm is applied in a recursive manner to control the number of line segments that will be generated to represent the curve. The greater the number of line segments, the closer these straight line segments will approximate the curve. For example, FIG. 10A represents a Bezier curve for the bottom portion 170 of the character "S" having a start point 154, an end point 156, and two control points 158 and 159. The curve is first divided into four segments by selecting three approximately equidistant points (x, y coordinates) 160, 161 and 162 on the curve between its start and end points, thus providing start and end points for four line segments approximating the curve, where the start and end points of each line segment are represented by successive pairs of points: points 154 and 160, 160 and 161, 161 and 162, and 162 and 156. To further approximate the curve, four new points 164, 165, 166, and 167 on the curve may be added between each of theses pairs of points, thus providing eight line segments having start and end points represented by successive pairs of points: points 154 and 164, 164 and 160, 160 and 165, 165 and 161, 161 and 166, 166 and 162, 162 and 167, and 167 and 156. The formation of additional line segments may continue in this manner to provide sixteen line segments, thirty-two line segments, and so on, approximating the curve, where the output of each recursion level is the input to the next level. Preferably, adjacent line segments are tangent to each other.

However, before applying the DeCasteljau algorithm, a check is made at step 125 to determine how many line segments should be generated to approximate the curve. This is based upon the amount of curvature of the curve. The greater the curvature, the more line segments will be used to approximate the curve. For example, the curvature may be a measure of the distance between the start and end points 154 and 156 of the curve in FIG. 10A in the x or y direction, and the perpendicular distance (as indicated by bidirectional arrows 169) of each control point 158 and 159 to an imaginary straight line 168 (dotted in FIG. 10A) connecting the start and end points. If such distances are greater than predefined threshold distances, sixteen line segments will be used, otherwise eight line segments will be used to approximate the curve. If desired, additional threshold distances may be checked to further determine if eight or four line segments are needed. The above distances may be in terms of the relative x and y coordinates of the points defining the curve. The number of line segments needed determines how many levels of recursion of the DeCasteljau algorithm will be performed, for example, sixteen line segment will requires three levels of recursion, and eight line segment will require two such levels. To limit the complexity of computation, the maximum number of line segments is preferably sixteen, however, the Bezier curve can be approximated into greater or fewer line segments in the above manner depending on desired approximation of the curve.

Each line segment produced by the DeCasteljau algorithm is defined by its starting point and end point in relative x, y coordinates. At step 128, a transformation matrix is then applied to the start and end points representing each line segment to generate a line segment of the desired scale, rotation, and shear (skew for italic). The matrix applied is described in an article by Foley et al., entitled "Matrix Transformations Applied to Graphics", in Computer Graphics Principals and Practice, Addison-Wesley, 1990, and also in the publication entitled "PostScript Language Reference Manual", second edition, 1990. For example, the matrix may be a 3 by 3 matrix having coefficients specifying the desired transformation. These coefficients are based upon the desired size of the characters (amount of scaling in the x and y directions), the amount of angular rotation, and the amount of shear (ratio of x to y), as specified by the application program running on CPU 12. CPU 12 applies the matrix to the start point and end point of the line segment provided by step 125 to calculate its new start point and end point. This matrix is applied by matrix multiplication with the x and y coordinates of the start and end points of the line segment. A smaller 2 by 1 matrix may be used if only scaling is needed, which specifies the amount of scale in x and y directions to reduce or enlarge the character to be rendered. For example, a line segment may be scaled from 10 point size to 30 point size, or vis versa. Preferably, the maximum size character is defined in the scalable font files in terms of relative coordinates on an imaginary x, y grid of 1024 by 1024 dots (approximately 1000 by 1000 dots), such that the matrix transformation reduces the character to the desired size within that grid, and if desired, also rotates or shears the character.

At step 130, the line is drawn, i.e., its dots or pixels determined, in image memory based on the coordinates of the new start and end points. Line drawing may be performed using the Bresenham's line drawing algorithm, as described, for example, in the section entitled "Bresenham's Line-Drawing Algorithm" of Zen of Graphics Programming by Michael Abrash (1993). The character outlines are drawn using relative coordinates, i.e, based upon the current virtual pen position in image memory. The virtual pen is moved from its current position to a new pen position. The move can be a straight line move along a line segment as defined by its start and end points. Since the current position (start point) is known, and the new position (end point) is known, the slope of each line segment drawn can be calculated as: slope=dy/dx or as slope=(new y−old y)/(new x−old x), where new x and y represent the coordinates of the end point of the line segment, and old x and y represent the coordinates of the start point of the line segment. The sign of the slope, either positive (+) or negative (−), for the line segment is determined in this manner. As the line is drawn, information about the line is logged (stored) in terms of the slope (or direction) of the line, and the x and y axis coordinates of each dot that makes up the line. A 2 byte (16 bits) unsigned integer value is used to track both the x coordinates and the slope by setting or clearing the high bit of the value to indicate a positive or negative slope, respectively. The remaining 15 bits represent the x coordinate value. The information about the line is stored in a two-dimensional array data structure with, for example, 800 rows and 16 columns. The row indexes represent which array of columns is being indexed and translates into y coordinate values. Each row index holds the x coordinate values of all lines that intersect the y coordinate value represented by the row. When all the outlines that define the character being rendered have been drawn, the information in this array will hold all x and y coordinate points that make up the outline along with the slope information for each point. The data in the array is defined as the character outline active edge data, and will later be used in filing in the outline of the character. Steps 128 and 130 are performed on all the line segments from step 125.

Steps 128 and 130 are also performed when a line segment op-code is read at step 120 (step 126). At step 128, CPU 12 retrieves from the stack data representing the start and end points of the line segment, and then applies the same matrix described earlier to the start and end points of the line segment to provide the desired transformation. The line segment is then drawn and active edges logged (step 130). After step 130, CPU 12 branches to step 120 to read the next op-code or data from the font file of the character to be rendered.

If the op-code read is neither a Bezier op-code, nor a line segment op-code at steps 124 and 126, CPU 12 checks if the op-code read is an end op-code (step 132). If so, then the outline of the character is complete and the outline is filled in using the data in the active edge list (step 134), otherwise, the branch is taken to step 133. Other op-codes for specifying features of scalable characters, as are typically used in Adobe Type 1 font files, may be stored in the scalable font files, such as horizontal or vertical stem width, and are described in detail in the earlier cited publication entitled "Adobe Type I Font Format". At step 133, these other op-codes may be read from the font file to accordingly update the outline of the character being drawn in image memory. After step 133, the branch is taken to step 120 to read the next op-code or data. the op-code read is an end op-code at step 132, then at step 134 the character outlined in image memory is filled in using the logged active edge data. To fill in the active edges, a winding number fill algorithm for polygon filing is used. Polygon filling is described in the section entitled "Active Edges" in Zen of Graphics Programming cited above. The following example of filling in an outline of the character "o" will illustrate the polygon filling process where the outside circle of the character is drawn in a counter-clockwise direction and the inner circle drawn in a clockwise direction. To fill the character in, horizontal lines are drawn across from the top of the outline and continue to the bottom. These horizontal lines are called scan lines. Drawing is started when an active edge is encountered with a negative slope and stops when an active edge with a positive slope is encountered. Thus, in drawing a single scan line across the center of the character "o", four edges would be encountered, starting with a negative slope, then alternating to positive slope, negative slope and then positive slope. Using these rules, two areas are filled in with dots in image memory across the center of the character within the outlines that define the character "o". After the entire outline of the character is filled in in image memory, CPU 12 advances the virtual pen for the next character to be rendered. In other words, the CPU 12 advances to the next space in image memory to represent the next character in the text line.

In this manner scalable fonts are provided in the printer, thus reducing the amount of memory 28 needed over the prior art label printers, which required storing in memory 28 font files represents multiple sets of pre-sized font characters. Although scalable fonts are preferably, alternatively, the system may also use pre-sized font files which define characters for each font as a bit map. These bit maps may be read by CPU 12 for each character to be rendered and then stored in image memory. Both pre-size font files and scalable font files may be stored in memory 28 (FIG. 2) and used by CPU 12 in accordance with the application program running on CPU 12. The character rendering program, and any of the other executable utility files, such as the bar code decode file, may alternatively be part of an application program.

Figure 11:
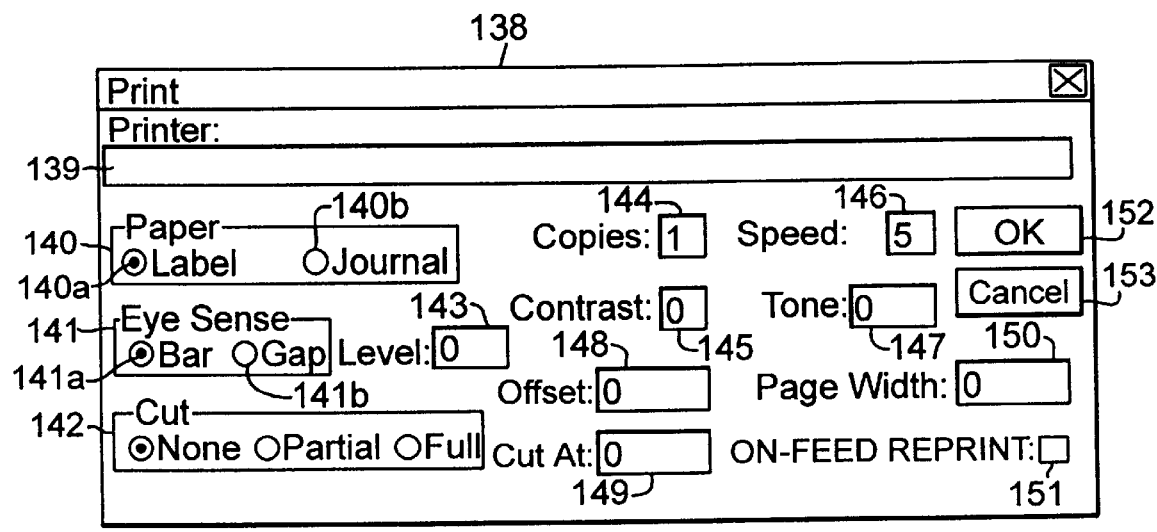
FIG. 11 is a screen of a graphical user interface on the display of a host computer interfaced to the controller of FIG. 2.

Referring to FIG. 11, a screen 138 is shown which appears on a display associated with the host computer. Screen 138 allows a user of the host computer to input data to an application program running on CPU 12. Display screen 138 represents a Windows based graphical user interface with various input boxes 140–151 allowing the user to communicate to the application program by setting the various different parameters of printer 10 operation. To generate the graphical user interface, Microsoft Visual C++ software may be used, or other similar programs. A keyboard and mouse of the host computer can allow the user to navigate through the input boxes screen 138. Each input box identifies a different parameter for controlling printer 10 operation. The input boxes of screen 138 are illustrative of the types of parameters the application program may allow the operator to set. Different boxes may be used depending on the application program. Each of the input boxes can have either selection buttons or an input field, as shown in FIG. 11. Line 139 of display screen 138 specifies the type of printer or the application program running on CPU 12 of the printer. Paper selection box 140 enables the user to select the type of label stock paper in the label printer, by clicking on either the label or journal buttons 140*a* or 140*b,* respectively. By clicking is meant hitting a switch on the mouse of the host computer, or an appropriate key on the keyboard of the host computer which provides a similar function. The label button selects label stock with discrete labels, while the journal button selects continuous form label stock. The eye sense selection box 141 enables the user to select the detection mode of paper sensor circuits 24 (FIG. 2) for either sensing of index mark or gaps on the label stock to determine the top of the label to be printed upon. Clicking on the bar button 141*a* allows the user to set circuits 24 for sensing index marks, such as a bar, on the label stock for each label, while clicking on the gap button 141*b* allows the user to set circuits 24 for sensing the gaps between labels. Level input box 143 allows the user to select the sensitivity threshold level of the sensing of index marks or gaps by circuits 24, which may vary in appearance based on the translucency of the web stock carrying the labels or contrast of index marks. By clicking on the appropriate button, cut selection box 142 allows the user to select how the optional cutter of the print mechanism engages the label stock after printer in terms of no cutting, partial cutting, of complete cutting of the label stock.

Other input boxes of display screen 138 include input boxes 144–151. Input box 144 selects the number of copies of each label. Input box 145 allows the user to set the black to white contrast of the print head by controlling the print head strobe time of its thermal printing elements. The longer this time the darker will be the contrast. Another box (not shown) may alternatively be used to allow the user to select the actual print head strobe time. Input box 146 selects the printer's speed for printing labels. Input box 147 sets the tone (darkness) of the print. Input box 148 sets the number of dots in millimeters, or inches, to shift the image to be printed. Input box 149 set the distance the label stock is advanced after printing before activating the cutter, and the distance the label stock is retracted after cutting. When printing a quantity of labels, the printer will begin printing the next label before activating the cutter. Input box 150 allows the user to set the width of the label onto which printing from image memory is performed. Clicking on the on-feed reprint selecting box 151 allows the user to activate a feed key on keypad 22 for reprinting the previous image on a label. Valid numbers in input boxes 144–150 are whole integer values. The user presses the OK button 152 to send the data representing the parameter settings entered on display screen 138 to CPU 12 via communication interface 18, 19 or 20. CPU 12 receives this data and sets up its circuitry based on these parameters. The host computer can also save the settings entered on screen 138 to a file on the host computer to record these settings. The cancel button 153 cancels printing with the selected settings and does not save the settings to a file.

From the foregoing description, it will be apparent that there has been provided an improved computer system in a portable label printer for storing and operating multiple application programs. Such application programs are capable of enabling a barcode decoding program using DMA to capture timer values, and a program for rendering scalable characters. Further, such application programs can utilize data entered via a Windows based display screen from a host computer to control parameters of printer operation. Variations and modifications in the herein described system in accordance with the invention will undoubted suggest themselves to those skilled in the art. Accordingly, the foregoing description should be taken as illustrative and not in a limiting sense.

What is claimed is:

1. A method for a printer wherein a plurality of application programs are implemented and used for controlling a printer mechanism in said printer to print information representing symbols, said method comprising the steps of:

providing memory in said printer addressable by said computer;

storing in said memory a plurality of application programs which are each executable by said computer;

selecting one of said application programs;

executing said selected application program on said computer to operate said printer in accordance with said selected application program;

receiving information for controlling printer operation from a host computer entered via a graphical user interface operating at the host computer in which said selected application program operates in accordance with said received information;

storing in said memory font files representing data defining an outline of characters to be printed, and a character rendering program;

executing said character rendering program on said computer in accordance with said selected application program;

scaling the outline of each of said characters defined by said font files to a certain size for printing;

storing said outline of each of said characters as an image in said memory;

filling in said outline of said characters in said image stored in said memory; and printing said characters from said image stored in said memory.

2. The method according to claim 1 wherein said scaling step further comprises rotating said outline of each of said characters a certain degree for printing.

3. The method according to claim 1 wherein said scaling step further comprises shearing said outline of each of said characters to provide printing of italic characters.

4. A system for communicating with a portable printer from a computer to control the operation of said printer comprising:

a computer and a display coupled to said computer;

a portable printer having means for communication with said computer;

means operable at said computer for providing at least one screen on said display which enables a user to input data representing settings of different parameters of printer operation; and means for sending said data to the printer to control the operation of the printer.

5. The system of claim 4 wherein said parameters comprise selection of paper type onto which said printer prints upon, selection of detection mode for one of index marks and gaps on said paper; and selection of type of cutting of said paper after being printed upon.

6. The system of claim 4 wherein said parameters comprise selection of printer strobe time, and selection of the speed of said printer.

7. The system of claim 4 wherein said screen has a plurality of boxes identifying said different parameters, in which each of said boxes have one of selection buttons or an input field.

8. The system according to claim 4 wherein said portable printer further comprises an application program, in which said portable printer operates in accordance with said application program, and said application program of said portable printer receives said sent data and operates said printer in accordance with said data.

9. A computer system for a printer wherein a plurality of application programs are implemented and used for controlling a printer mechanism in said printer to print information representing symbols, said system comprising:

memory in said printer addressable by said computer of said printer;

an operating system program stored in said memory which operates on said computer when said computer is activated;

a plurality of application programs stored in said memory, each of said application programs being executable by said computer in which at least one of said application programs utilizes a character rendering program for scaling fonts of characters to be printed; and said operating system providing means for selecting one of said application programs and executing said selected application program on said computer to operate said printer in accordance with said selected application program, in which said selected application program operates in accordance with data received from a host computer to set parameters of printer operation in which said data is entered by a user via a graphical user interface provided for at said host computer.

10. The system according to claim 9 further comprising a plurality of utility files stored in said memory, wherein said plurality of utility files comprises font files representing data defining an outline of characters to be printed and said character rending program represents one of said plurality of utility files executable by said computer in accordance with said selected application program, in which said computer operates in accordance with said character rendering program to scale the outline of each of said characters defined by said font files to a certain size for printing.

11. The system according to claim 10 wherein said character rendering program stores said outline of each of said characters as an image in said memory.

12. The system according to claim 10 wherein said character rendering program further provides for rotating or shearing each of said characters for printing.

13. The system according to claim 11 wherein said character rendering program further provides for filling in said outline of said characters in said image stored in said memory.

14. The system according to claim 12 wherein said computer prints said characters from said image stored in said memory.

15. A computer system for a portable printer utilizing a barcode scanner which provides scan data representative of a barcode, said system comprising:

memory in said printer addressable by said computer of said printer;

an operating system program stored in said memory which operates on said computer when said computer is activated;

at least one application program stored in said memory which controls the printer mechanism and is capable of utilizing a barcode decoding program stored in said memory for decoding the scan data from said barcode scanner;

said operating system providing means for executing said application program on said computer to operate said printer in accordance with said application program; and said application program operates in accordance with data received from a host computer to set parameters of printer operation in which said data is entered by a user via a graphical user interface provided for at said host computer.

16. The system according to claim 15 further comprising said host computer having a display, said host computer being capable of interfacing with said computer of said printer for transferring data there between, said display being a part of said graphical user interface and having at least one screen which provides for inputting information setting parameters for operating the printer, in which said host computer sends said information to said computer in accordance with said application program.

17. A method for a portable printer for controlling a printer mechanism in said printer to print information representing symbols, and a barcode scanner controllable by said computer which can provide scan data representative of a barcode, said method comprising the steps of:

providing memory in said printer addressable by said computer;

storing in said memory at least one application program executable by said computer in which said application programs controls the printer mechanism and provides for barcode decoding of the scan data from the barcode scanner;

executing said application program on said computer to operate said printer in accordance with said application program; and receiving information for controlling printer operation from a host computer entered via a graphical user interface operating at the host computer in which said application program operates in accordance with said received information.

* * * * *